(12) United States Patent
Lin et al.

(10) Patent No.: US 11,835,204 B2
(45) Date of Patent: Dec. 5, 2023

(54) LATERAL LIGHT EMITTING ATMOSPHERIC DOWNLIGHT

(71) Applicant: Xiamen Topstar Lighting Co., Ltd., Xiamen (CN)

(72) Inventors: Jincong Lin, Xiamen (CN); Jinhua Liao, Xiamen (CN); Yuanwen Wang, Xiamen (CN); Yebiao Huang, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 18/186,677

(22) Filed: Mar. 20, 2023

(65) Prior Publication Data
US 2023/0228403 A1 Jul. 20, 2023

(30) Foreign Application Priority Data
Mar. 1, 2023 (CN) .......................... 202320356768.7

(51) Int. Cl.
*F21V 17/16* (2006.01)
*F21V 19/00* (2006.01)
*F21V 17/14* (2006.01)
*F21V 21/008* (2006.01)

(52) U.S. Cl.
CPC .......... *F21V 17/162* (2013.01); *F21V 19/007* (2013.01); *F21V 17/14* (2013.01); *F21V 21/008* (2013.01); *F21V 2200/20* (2015.01)

(58) Field of Classification Search
CPC .. F21V 17/162; F21V 19/007; F21V 2200/20; F21V 21/008; F21Y 2103/33; F21Y 2107/30

USPC .......................................................... 362/365
See application file for complete search history.

(56) References Cited

U.S. PATENT DOCUMENTS 7,217,008 B2 * 5/2007 Thompson .............. F21V 19/04
362/372
2021/0318486 A1 * 10/2021 Li ............................ F21S 8/04

FOREIGN PATENT DOCUMENTS

DE 202021104939 U1 * 10/2021 ................ F21S 8/04
GB 2585705 A * 1/2021 .......... F21V 33/0064

OTHER PUBLICATIONS

Translation of DE202021104939U1, (Year: 2021).*

* cited by examiner

*Primary Examiner* — Laura K Tso
(74) *Attorney, Agent, or Firm* — Westbridge IP LLC

(57) ABSTRACT

A lateral light emitting atmospheric downlight includes a light body, a first light source module, a second light source module and a light guide module. An upper end and a lower end of the light body are respectively provided with a communicating opening, the first light source module is arranged around an inner wall of the light body, the light guide module is arranged in the light body, and a light exiting surface of the first light source module is opposite to the light guide module; the second light source module is arranged around an outer wall of the light body, and one side, away from the light body, of the second light source module emits light. With the design above, multi-directional light emission of the downlight is achieved.

7 Claims, 3 Drawing Sheets

LATERAL LIGHT EMITTING ATMOSPHERIC DOWNLIGHT

CROSS-REFERENCE TO RELATED APPLICATIONS

The present application claims priority to Chinese Patent Application No. 202320356768.7, filed on Mar. 1, 2023, the content of which is incorporated herein by reference in its entirety.

TECHNICAL FIELD

The present disclosure relates to the field of lamp equipment, and in particular to a lateral light emitting atmospheric downlight.

BACKGROUND

With single lighting function, a conventional downlight cannot meet the needs of modern high-quality life, and cannot provide a more comfortable lighting environment. Taking a ceiling-mounted downlight as an example, such as a light emitting diode (LED) downlight heat dissipation structure and an LED downlight disclosed in Chinese invention patent with the application number CN201922089207.1, the lighting function of the LED downlight only has an effect on the space below the mounted downlight, so that the lighting direction is single and light cannot be emitted from a lateral angle of the downlight.

SUMMARY

The technical problem to be solved by the present disclosure is to provide a lateral light emitting atmospheric downlight capable of emitting light in multiple directions and achieving different lighting functions.

In order to solve the technical problem above, the technical solution adopted by the present disclosure is as follows: a lateral light emitting atmospheric downlight includes a light body, a first light source module, a second light source module and a light guide module, wherein an upper end and a lower end of the light body are respectively provided with a communicating opening, the first light source module is arranged around an inner wall of the light body, the light guide module is arranged in the light body, and a light emitting surface of the first light source module is opposite to the light guide module; and the second light source module is arranged around an outer wall of the light body, and one side, away from the light body, of the second light source module emits light.

Further, a diffusion cover is also included, wherein the diffusion cover is clamped at one end of the light body, and a light emitting surface of the second light source module is opposite to the diffusion cover.

Further, a first buckling position and a first buckle are respectively provided on the diffusion cover corresponding to an edge of the opening in the upper end of the light body and an edge of the opening in the lower end of the light body; and the edge of the opening in the upper end of the light body and the edge of the opening in the lower end of the light body are respectively provided with a second buckle and a second buckling position adapted to the first buckling position and the first buckle corresponding to the first buckling position and the first buckle.

Further, the diffusion cover is provided with a positioning block in a protruding way towards the light body, and the light body is provided with a positioning notch adapted to the positioning block corresponding to the positioning block.

Further, a radiator is also included, wherein the radiator is arranged at one end of the light body.

Further, a tablet pressing module is also included, wherein the tablet pressing module includes a locking part and an abutting part; and the locking part is locked at one end of the light body, and the abutting part abuts against one side, away from the light body, of the radiator.

Further, a spring module is also included, wherein one end of the light body is provided with a bayonet socket, and the bayonet socket is internally provided with a socket; and one end of the spring module is inserted into the socket.

Further, the opening in one end of the light body is provided with a light blocking convex edge extending towards a middle portion of the light body; and the light guide module and the first light source module abut against the light blocking convex edge.

Further, a blocking ring is arranged on the light blocking convex edge, a gap is reserved between the blocking ring and the inner wall of the light body, and the blocking ring extends towards the inner wall of the light body to form a radiating fin; and the first light source module is arranged on the blocking ring.

The beneficial effects of the present disclosure are as follows: by matching the first light source module with the light guide module, after light is emitted from the first light source module arranged on the inner wall of the light body, the light is guided by the light guide module to uniformly emit from the opening in one end of the light body, so as to achieve lighting of one end of the downlight; while the second light source module directly emits light from the outer wall of the light body, so as to achieve lighting of a peripheral surface of the downlight. With the design above, multi-directional light emission of the downlight is achieved.

DETAILED DESCRIPTIONS OF THE EMBODIMENTS

In order to explain the technical contents, the objects, and the effects of the present disclosure in detail, the embodiments will be described below with reference to the accompanying drawings.

Figure 1:
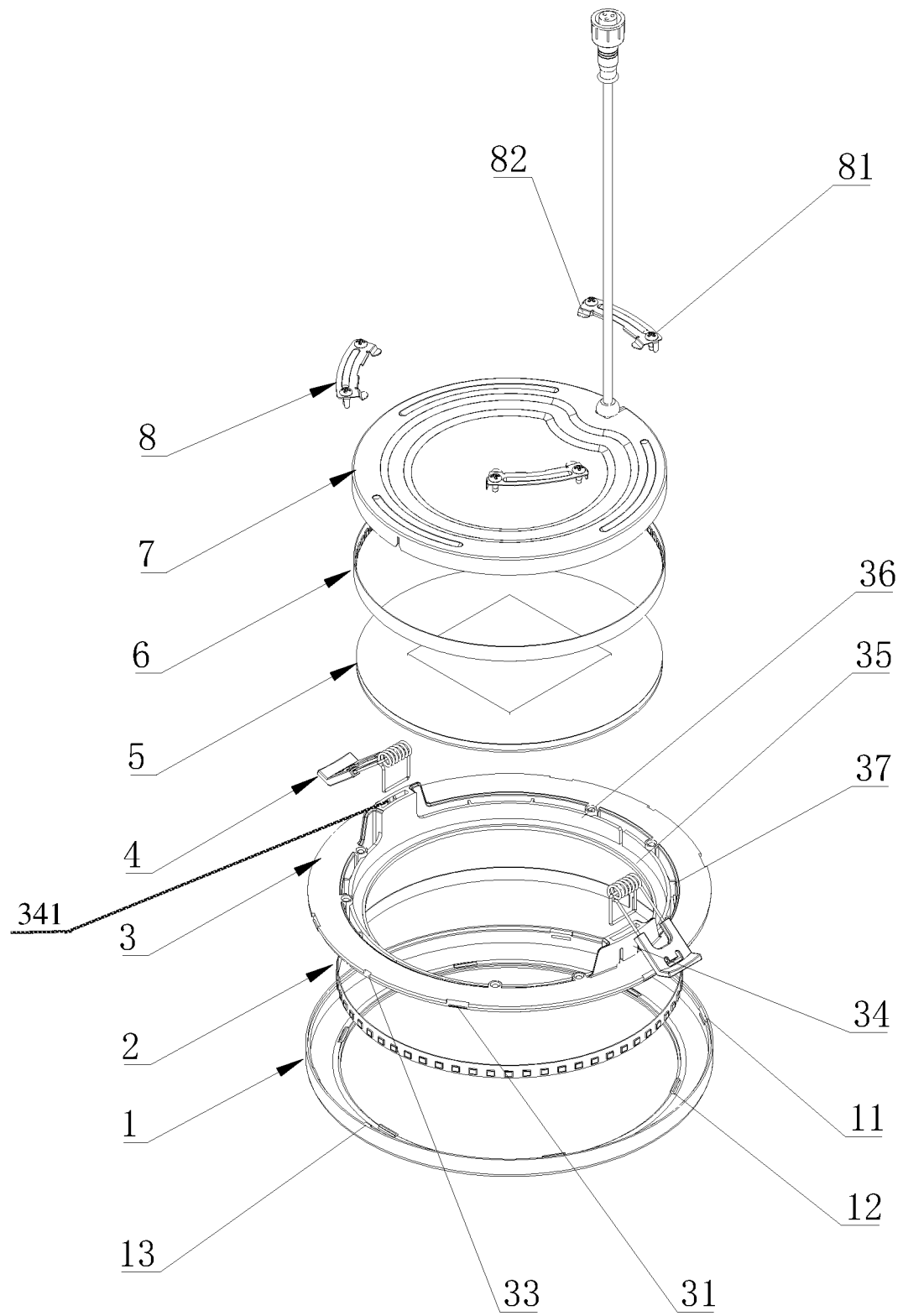
FIG. 1 is an exploded view of a lateral light emitting atmospheric downlight according to an embodiment of the present disclosure.
Figure 2:
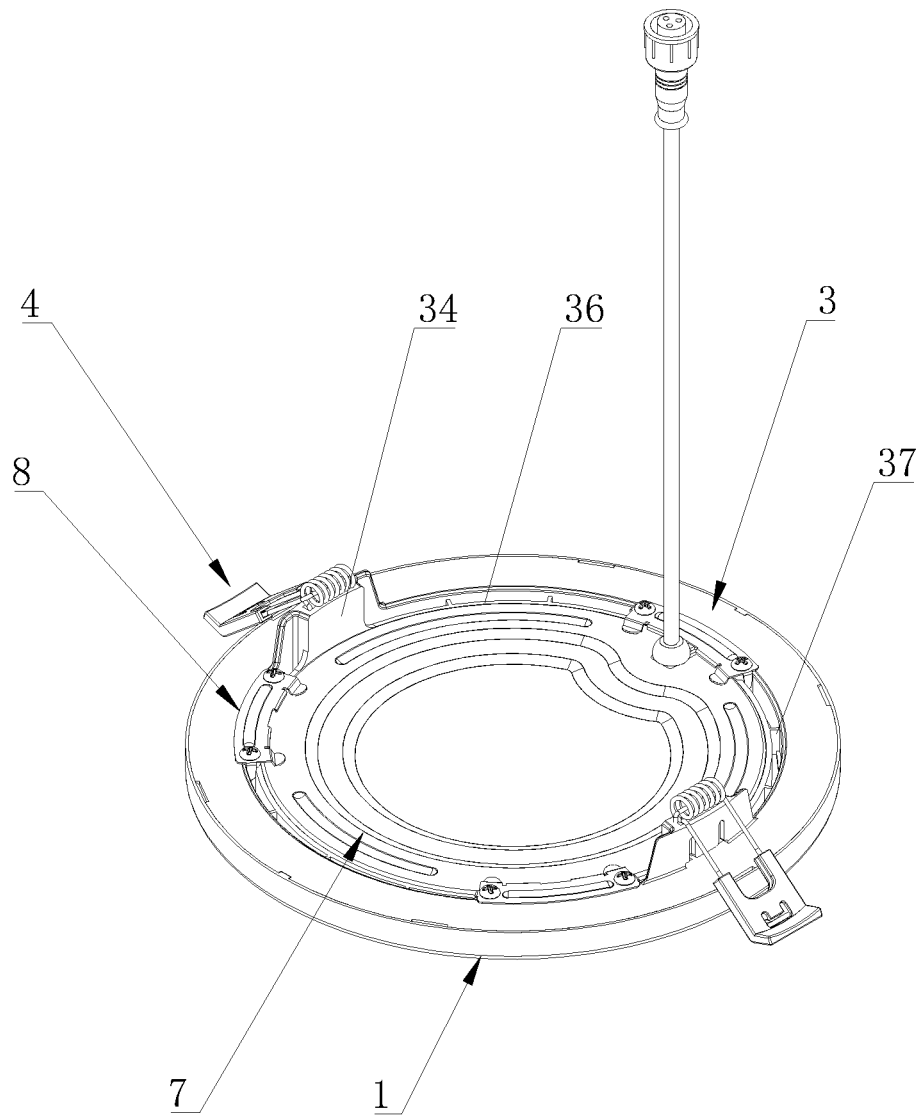
FIG. 2 is a schematic view showing a structure of an upper end of a light body of the lateral light emitting atmospheric downlight according to the embodiment of the present disclosure.
Figure 3:
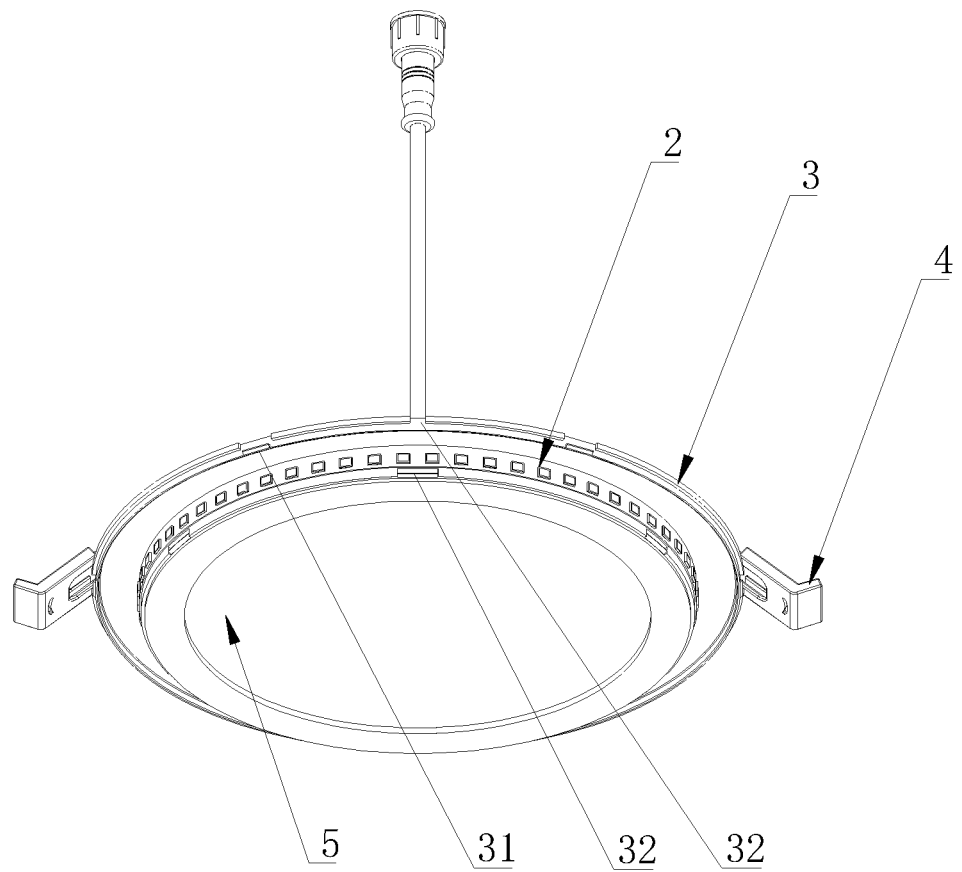
FIG. 3 is a schematic view showing a structure of a lower end of the light body of the lateral light emitting atmospheric downlight according to the embodiment of the present disclosure after a diffusion cover is removed.

With reference to FIG. 1 to FIG. 3, a lateral light emitting atmospheric downlight includes a light body 3, a first light source module 6, a second light source module 2 and a light guide module 5, wherein an upper end and a lower end of the light body 3 are respectively provided with a communicating opening, the first light source module 6 is arranged around an inner wall of the light body 3, the light guide module 5 is arranged in the light body 3, and a light emitting surface of the first light source module 6 is opposite to the light guide module 5; and the second light source module 2 is arranged around an outer wall of the light body 3, and one side, away from the light body 3, of the second light source module 2 emits light.

As can be seen from the description above, the present disclosure has the following beneficial effects: by matching the first light source module 6 with the light guide module 5, after light is emitted from the first light source module 6 arranged on the inner wall of the light body 3, the light is guided by the light guide module 5 to uniformly emit from the opening in one end of the light body 3, so as to achieve lighting of one end of the downlight; while the second light source module 2 directly emits light from the outer wall of the light body 3, so as to achieve lighting of a peripheral surface of the downlight. With the design above, multi-directional light emission of the downlight is achieved.

Further, a diffusion cover 1 is also included, wherein the diffusion cover 1 is clamped at one end of the light body 3, and a light emitting surface of the second light source module 2 is opposite to the diffusion cover 1.

As can be seen from the description above, by arranging the diffusion cover 1, a diffusion angle of the light emitted from the second light source module 2 is changed, so that a light emitting effect different from that of the first light source module 6 is achieved.

Further, a first buckling position 11 and a first buckle 12 are respectively provided on the diffusion cover 1 corresponding to an edge of the opening in the upper end of the light body 3 and an edge of the opening in the lower end of the light body 3; and the edge of the opening in the upper end of the light body 3 and the edge of the opening in the lower end of the light body 3 are respectively provided with a second buckle 31 and a second buckling position 32 adapted to the first buckling position 11 and the first buckle 12 corresponding to the first buckling position 11 and the first buckle 12.

As can be seen from the description above, by respectively matching the first buckling position 11 and the first buckle 12 of the diffusion cover 1 with the second buckle 31 and the second buckling position 32, rapid assembly of the diffusion cover 1 on the light body 3 is achieved; and the assembled diffusion cover 1 covers a side surface of the light body 3, so as to ensure the light emitting effect of the second light source module 2.

Further, the diffusion cover 1 is provided with a positioning block 13 in a protruding way towards the light body 3, and the light body 3 is provided with a positioning notch 33 adapted to the positioning block 13 corresponding to the positioning block 13.

As can be seen from the description above, through the design of the positioning block 13 and the positioning notch 33, rapid positioning and clamping of the diffusion cover 1 with the light body 3 are facilitated.

Further, a radiator 7 is also included, wherein the radiator 7 is arranged at one end of the light body 3.

As can be seen from the description above, the radiator 7 is used for dissipating heat generated when the first light source module 6 and the second light source module 2 are conducted on the light body 3 to emit light.

Further, a tablet pressing module 8 is also included, wherein the tablet pressing module 8 includes a locking part 81 and an abutting part 82; and the locking part is locked at one end of the light body 3, and the abutting part 82 abuts against one side, away from the light body 3, of the radiator 7.

As can be seen from the description above, the tablet pressing module 8 is fixed by the connection of the locking part 81 of the tablet pressing module 8; while the abutting part 82 of the tablet pressing module 8 can abut against the radiator 7, so that one end, close to the light body 3, of the radiator 7 is prevented from sliding.

Further, a spring module 4 is also included, wherein one end of the light body 3 is provided with a bayonet socket 34, and the bayonet socket 34 is internally provided with a socket 341; and one end of the spring module 4 is inserted into the socket 341.

As can be seen from the description above, the spring module 4 is used for fixing the downlight on a ceiling; and rapid installation is achieved by means of the plug-in design of the spring module 4 and the bayonet socket 34.

Further, the opening in one end of the light body 3 is provided with a light blocking convex edge 35 extending towards a middle portion of the light body 3; and the light guide module 5 and the first light source module 6 abut against the light blocking convex edge 35.

As can be seen from the description above, through the arrangement of the light blocking convex edge 35 at the opening in one end of the light body 3, on the one hand, an effect of bearing the light guide module 5 and the first light source module 6 can be achieved; on the other hand, one side of the first light source module 6 can be prevented from directly emitting light towards the opening in one end of the light body 3 to affect the light emitting effect of the light guide module 5.

Further, a blocking ring 36 is arranged on the light blocking convex edge 35, a gap is reserved between the blocking ring 36 and the inner wall of the light body 3, and the blocking ring 36 extends towards the inner wall of the light body 3 to form a radiating fin 37; and the first light source module 6 is arranged on the blocking ring 36.

As can be seen from the description above, through the arrangement of the blocking ring 36, a heat dissipation gap is generated between the first light source module 6 and the second light source module 2, namely, the gap between the blocking ring 36 and the inner wall of the light body 3, so that the two light source modules can better dissipate heat; meanwhile, through the arrangement of the radiating fin 37 on the blocking ring 36, a heat dissipation area can be further increased.

With reference to FIG. 1 to FIG. 3, example one of the present disclosure is as follows.

An application scene of the present disclosure is as follows: in terms of light emitting design of the downlight, the conventional downlight can only emit light downwards after being arranged on the ceiling, so that the light emitting direction is single, and lateral light emitting cannot be achieved.

As shown in FIG. 1 to FIG. 3, a lateral light emitting atmospheric downlight according to the example of the present disclosure includes a light body 3, a first light source module 6, a second light source module 2, a light guide module 5, a diffusion cover 1, a radiator 7, a tablet pressing module 8 and a spring module 4.

The light body 3 is cylindrical, an upper end and a lower end of the light body 3 are respectively provided with a communicating opening, the upper end of the light body 3 is provided with a convex edge, the upper end of the light body 3 is a mounting surface, and the lower end of the light body 3 is a light emitting surface.

As shown in FIG. 1 and FIG. 2, the opening in the lower end of the light body 3 is provided with a light blocking convex edge 35 extending towards a middle portion of the light body 3; and a blocking ring 36 is arranged on the light blocking convex edge 35, a gap is reserved between the blocking ring 36 and the inner wall of the light body 3, and the blocking ring 36 extends towards the inner wall of the light body 3 to form a radiating fin 37.

The first light source module 6 is arranged on the blocking ring 36 and arranged around the inner wall of the light body 3; and the light guide module 5 is arranged in the light body 3, a light emitting surface of the first light source module 6 is opposite to the light guide module 5, and the light guide module 5 and the first light source module 6 abut against the light blocking convex edge 35.

The second light source module 2 is arranged around an outer wall of the light body 3, and one side, away from the light body 3, of the second light source module 2 emits light.

The diffusion cover 1 is clamped with the light body 3, and a light emitting surface of the second light source module 2 is opposite to the diffusion cover 1.

As shown in FIG. 1 to FIG. 3, specifically, a first buckling position 11 and a first buckle 12 are respectively provided on the diffusion cover 1 corresponding to an edge of the opening in the upper end of the light body 3 and an edge of the opening in the lower end of the light body 3; and the edge of the opening in the upper end of the light body 3 and the edge of the opening in the lower end of the light body 3 are respectively provided with a second buckle 31 and a second buckling position 32 adapted to the first buckling position 11 and the first buckle 12 corresponding to the first buckling position 11 and the first buckle 12.

Meanwhile, the diffusion cover 1 is provided with a positioning block 13 in a protruding way towards the light body 3, and the upper end of the light body 3 is provided with a positioning notch 33 adapted to the positioning block 13 corresponding to the positioning block 13.

As shown in FIG. 1 and FIG. 2, the radiator 7 is arranged at the upper end of the light body 3, the tablet pressing module 8 includes a locking part 81, an abutting part 82 and a limiting part; the locking part is locked at the upper end of the light body 3, the abutting part 82 abuts against one side, away from the light body 3, of the radiator 7, the limiting part is inserted into a gap between the blocking ring 36 and the inner wall of the light body 3, so as to ensure that the tablet pressing module 8 is firm and reliable after being mounted. Specifically, an outer edge of the radiator 7 extends downwards, so that the outer edge of the radiator 7 extends between the blocking ring 36 and the first light source module 6 after the radiator 7 is mounted, and the first light source module 6 directly contacts with the radiator 7.

The upper end of the light body 3 is provided with a bayonet socket 34, and the bayonet socket 34 is internally provided with a socket 341; and one end of the spring module 4 is inserted into the socket 341.

The operation principles of the present disclosure are as follows: in use, the first light source module 6 or the second light source module 2 or both can be selected to emit light according to light emitting requirements; when the first light source module 6 emits light, the light is guided by the light guide module 5, so that the light is emitted from the lower end of the light body 3; when the second light source module 2 emits light, the light is directly emitted towards the side surface of the light body 3, and a diffusion angle of the light is changed by the diffusion cover 1 so as to achieve the required light emitting effect.

In summary, for the lateral light emitting atmospheric downlight provided by the present disclosure, by matching the first light source module with the light guide module, after the first light source module arranged on the inner wall of the light body emits light, the light is guided by the light guide module to uniformly emit from the opening in one end of the light body, so as to achieve lighting of one end of the downlight; while the second light source module directly emits light from the outer wall of the light body, so as to achieve lighting of a peripheral surface of the downlight. With the design above, multi-directional light emission of the downlight is achieved.

The foregoing is directed to examples of the present disclosure, and does not therefore limit the patent scope of the present disclosure. Any equivalent transformation made by using the contents of the description and the accompanying drawings of the present disclosure, or directly or indirectly applied in the relevant technical field, shall be similarly included in the patent protection scope of the present disclosure.

What is claimed is:

1. A lateral light emitting atmospheric downlight, comprising a light body, a first light source module, a second light source module and a light guide module, wherein an upper end and a lower end of the light body are respectively provided with a communicating opening, the first light source module is arranged around an inner wall of the light body, the light guide module is arranged in the light body, and a light exiting surface of the first light source module is facing the light guide module; and the second light source module is arranged around an outer wall of the light body, and one side, away from the light body, of the second light source module emits light;

wherein the opening in one end of the light body is provided with a light blocking convex edge extending towards a middle portion of the light body; and the light guide module and the first light source module abut against the light blocking convex edge; and wherein a blocking ring is arranged on the light blocking convex edge, a gap is reserved between the blocking ring and the inner wall of the light body, and the blocking ring extends towards the inner wall of the light body to form a radiating fin; and the first light source module is arranged on the blocking ring.

2. The lateral light emitting atmospheric downlight according to claim 1, further comprising a diffusion cover, wherein the diffusion cover is clamped at one end of the light body, and a light exiting surface of the second light source module is opposite to the diffusion cover.

3. The lateral light emitting atmospheric downlight according to claim 2, wherein a first buckling position and a first buckle are respectively provided on the diffusion cover corresponding to an edge of the opening in the upper end of the light body and an edge of the opening in the lower end of the light body; and the edge of the opening in the upper end of the light body and the edge of the opening in the lower end of the light body are respectively provided with a second buckle and a second buckling position adapted to the first buckling position and the first buckle corresponding to the first buckling position and the first buckle.

4. The lateral light emitting atmospheric downlight according to claim 2, wherein the diffusion cover is provided with a positioning block in a protruding way towards the light body, and the light body is provided with a positioning notch adapted to the positioning block corresponding to the positioning block.

5. The lateral light emitting atmospheric downlight according to claim 1, further comprising a radiator, wherein the radiator is arranged at one end of the light body.

6. The lateral light emitting atmospheric downlight according to claim 5, further comprising a tablet pressing module, wherein the tablet pressing module comprises a locking part and an abutting part; and the locking part is locked at one end of the light body, and the abutting part abuts against one side of the radiator that is away from the light body.

7. The lateral light emitting atmospheric downlight according to claim 1, further comprising a spring module, wherein one end of the light body is provided with a bayonet socket, and the bayonet socket is internally provided with a socket; and one end of the spring module is inserted into the socket.

\* \* \* \* \*